United States Patent
Katz et al.

(10) Patent No.: US 6,490,315 B2
(45) Date of Patent: Dec. 3, 2002

(54) CODE SYNCHRONIZATION METHOD AND RECEIVER

(75) Inventors: Marcos Katz, Oulu (FI); Jari Iinatti, Oulu (FI); Savo Glisic, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/968,625

(22) Filed: Oct. 2, 2001

(65) Prior Publication Data

US 2002/0041202 A1 Apr. 11, 2002

Related U.S. Application Data

(63) Continuation of application No. PCT/FI01/00117, filed on Feb. 8, 2001.

(30) Foreign Application Priority Data

| Feb. 9, 2000 | (FI) | ................................. | 20000273 |
| Sep. 28, 2000 | (FI) | ................................. | 20002134 |

(51) Int. Cl.$^7$ .......................... H04B 15/00; H04K 1/00; H04L 27/30
(52) U.S. Cl. ....................................... 375/149
(58) Field of Search ............................... 375/130, 140, 375/145, 149, 367; 370/515

(56) References Cited

U.S. PATENT DOCUMENTS

| 5,642,377 A | | 6/1997 | Chung et al. |
| 6,111,538 A | * | 8/2000 | Schuchman et al. |
| 6,118,767 A | | 9/2000 | Shen et al. |

FOREIGN PATENT DOCUMENTS

| EP | 806 844 | 11/1997 |
| EP | 945 994 | 9/1999 |
| WO | WO 98/27669 | 6/1998 |
| WO | WO 00/36765 | 6/2000 |

OTHER PUBLICATIONS

Simon et al., "Single Dwell AcquisitionTime Performance in the Absence of Code Doppler," Pseudonoise Code Acquisition in Direct–Sequence Receivers, Spread Spectrum Communications Handbook, Revised Edition, McGraw–Hill, pp. 768–771.

Katz, et al., "Two Dimensional Code Acquisition in Fixed Multipath Channels," Vehicular Technology Conference 2000, IEEE 2000, 52nd, vol. 5, pp. 2317–2324.

Katz, et al., "Two–Dimensional Code Acquisition Using Antenna Arrays," IEEE 6th Int. Symp. on Spread Spectrum Technology & Applications, Sep. 2000, pp. 613–617.

* cited by examiner

Primary Examiner—Jean Corrielus
(74) Attorney, Agent, or Firm—Pillsbury Winthrop LLP

(57) ABSTRACT

A method for carrying out code synchronization when a signal has been spread-coded by a pseudo-random spreading code. The method comprises forming angular cells (400, 402, 404, 406, 408, 410), determining interference power in each angular cell (400, 402, 404, 406, 408, 410), arranging the angular cells (400, 402, 404, 406, 408, 410) according to the interference power, carrying out code acquisition by examining the arranged angular cells (400, 402, 404, 406, 408, 410) by using different delays of the spreading code, starting from the angular cell with the lowest interference power. The angular cells (400, 402, 404, 406, 408, 410) can e.g. be arranged as a vector in ascending order according to the interference power. The method comprises determining the number of angular cells to be formed e.g. by means of an estimated interference power.

46 Claims, 7 Drawing Sheets

CODE SYNCHRONIZATION METHOD AND RECEIVER

This application is a Continuation of International Application PCT/FI10/00117 filed Feb. 8, 2001 which designated the U.S. and was published under PCT Article 21(2) in English.

FIELD OF THE INVENTION

The invention relates to synchronization of a receiver with a signal to be received.

BACKGROUND OF THE INVENTION

In CDMA (Code Division Multiple Access), a narrowband data signal of a user is modulated to a relatively broad band by a spreading code which is more broadband than the data signal. The known CDMA systems use bandwidths over 1 MHz. In a WCDMA (Wide-band CDMA) radio system, the bandwidth is even much more greater since the current mobile telephone networks aim to provide the user with increasingly versatile services.

The spreading code of the CDMA radio system usually comprises a long pseudo-random bit sequence. The bit rate of the spreading code is much higher than that of the data signal and, as distinct from data bits and data symbols, the bits of a spreading code are called chips. Each data symbol of the user is multiplied by the chips of the spreading code. The narrowband data signal thus spreads to the frequency band used by the spreading code. Each user has a unique spreading code. A spreading code may be one or more data bits long. A plurality of users transmit simultaneously in the same frequency band, and the data signals are separated in the receivers on the basis of the pseudo-random spreading code.

In spread-spectrum systems, such as the CDMA radio system, a receiver should synchronize with the signal to be received in order for enabling signal modulation and detection. Code synchronization is usually divided in two parts: code acquisition and code tracking. In code acquisition, the timing difference between the spreading code of a code generator of the receiver and the spreading code of the received signal is to be no more than one chip of the spreading code. To achieve this, the spreading code of the code generator of the receiver is delayed chip by chip, searching for the delay between the signal spreading code and the code generator spreading code. Code acquisition is the most challenging task in spread-spectrum receivers. In code tracking, in turn, the aim is to keep the timing inaccuracy as low as possible, i.e. fractions of a chip.

Code acquisition is carried out e.g. using a simple correlator. When the spreading code of the signal to be received and the spreading code of the code generator of the receiver are not synchronized, the output of the correlator is provided with a low value. But when the spreading code of the signal to be received and the spreading code of the code generator of the receiver are synchronous, i.e. the delay of the spreading code of the code generator of the receiver is a correct one, the output value of the correlator is high. Code acquisition can also be carried out using a matched filter. A threshold detector is typically connected to an output of the matched filter to indicate that synchronization has been found.

Radio telecommunication connections are susceptible to interference. For instance, multiple access interference MAI, noise and multipath propagation cause great temporary values at the output of the correlator even if the spreading code of the signal to be received and the spreading code of the code generator of the receiver were asynchronous. This results in a false alarm and prolonged code acquisition. In order to reduce the effect of false alarms, the delay obtained in code acquisition should be verified by a second correlation measurement, which results in a longer synchronization time.

BRIEF DESCRIPTION OF THE INVENTION

An object of the invention is to provide an improved method for carrying out synchronization, and a receiver whereto the method can be applied. This is achieved by a method for carrying out code synchronization when a signal has been spread-coded by a pseudo-random spreading code. The method comprises forming angular cells, determining interference power in each angular cell, arranging the angular cells according to the interference power, carrying out code acquisition by examining the arranged angular cells by using different delays of the spreading code, starting from the angular cell with the lowest interference power.

The invention further relates to a method for carrying out code synchronization when a signal has been spread-coded by a pseudo-random spreading code. The method comprises forming angular cells, determining interference power in each angular cell, determining user equipment location probabilities in each angular cell, determining a code acquisition order for the angular cells by utilizing an interference power estimate and location probability information on the user equipment, carrying out code acquisition by examining the angular cells in chosen order.

The invention further relates to a method for carrying out code synchronization when a signal has been spread-coded by a pseudo-random spreading code. The method comprises forming angular cells, determining user equipment location probabilities in each angular cell, determining a code acquisition order for the angular cells by utilizing location probability information on the user equipment, carrying out code acquisition by examining the angular cells in chosen order.

The invention further relates to a receiver implementing the method, the receiver being arranged to carry out code acquisition from a signal to be received, the signal having been spread-coded by a pseudo-random spreading code. The receiver comprises means for forming angular cells, the receiver comprises means for determining interference power in each angular cell, the receiver comprises means for arranging the angular cells according to the interference power, the receiver comprises means for carrying out code acquisition by examining the arranged angular cells by using different delays of the spreading code, starting from the angular cell with the lowest interference power.

The invention further relates to a receiver arranged to carry out code acquisition from a signal to be received, the signal having been spread-coded by a pseudo-random spreading code. The receiver comprises means for forming angular cells, the receiver comprises means for determining interference power in each angular cell, the receiver is arranged to determine user equipment location probabilities in each angular cell or the receiver is arranged to utilize location probability information on the user equipment, the receiver comprises means for determining a code acquisition order for the angular cells by utilizing an interference power estimate and the location probability information on the user equipment, the receiver comprises means for carrying out code acquisition by examining the arranged angular cells in chosen order.

The invention further relates to a receiver arranged to carry out code acquisition from a signal to be received, the signal having been spread-coded by a pseudo-random spreading code. The receiver comprises means for forming angular cells, the receiver is arranged to determine user equipment location probabilities in each angular cell or the receiver is arranged to utilize location probability information on the user equipment, the receiver comprises means for determining a code acquisition order for the angular cells by utilizing the location probability information on the user equipment, the receiver comprises means for carrying out code acquisition by examining the arranged angular cells in chosen order.

Preferred embodiments of the invention are disclosed in the dependent claims.

The idea underlying the invention is that code acquisition is carried out two-dimensionally, the dimensions being time dimension and angular dimension. Code acquisition utilizing the angular dimension is carried out by using several parallel antenna beams, i.e. angular cells. The interference level of the angular cells, i.e. interference power (also called interference level), is determined and the angular cells are arranged preferably as a vector wherein the order of elements is determined according to the interference power. Interference power also comprises noise. Code acquisition starts from the angular cell with the lowest interference power. An alternative is to determine user equipment location probabilities and to arrange the angular cells such that code acquisition is first carried out in the angular cell in which the user equipment is located most likely, and last in the angular cell in which the user equipment is located least likely. An alternative is also to combine these angular cell arrangement methods. Code acquisition then starts from the cell in which the interference level and the location probability are optimized, e.g. code acquisition starts from an angular cell with a low, but not necessarily the lowest, interference level if it is highly probable that the user equipment is located in this angular cell.

The method and system of the invention provide several advantages. Code acquisition can be made more efficient in an environment containing interference particularly when the interference levels vary in different angular cells. The method and system of the invention enable the time spent on code acquisition to be shortened.

BRIEF DESCRIPTION OF THE DRAWINGS

The invention is now described in connection with the preferred embodiments and with reference to the accompanying drawings, in which.

DESCRIPTION OF EMBODIMENTS

A solution of the invention is suited particularly to the CDMA radio system which employs a direct sequence DS technique. Other applications include e.g. satellite systems, military telecommunication systems and private, non-cellular networks. The solution of the invention is not, however, restricted to these.

The next example will describe preferred embodiments of the invention in a universal mobile telephone system UMTS without, however, restricting the invention thereto.

Figure 1:
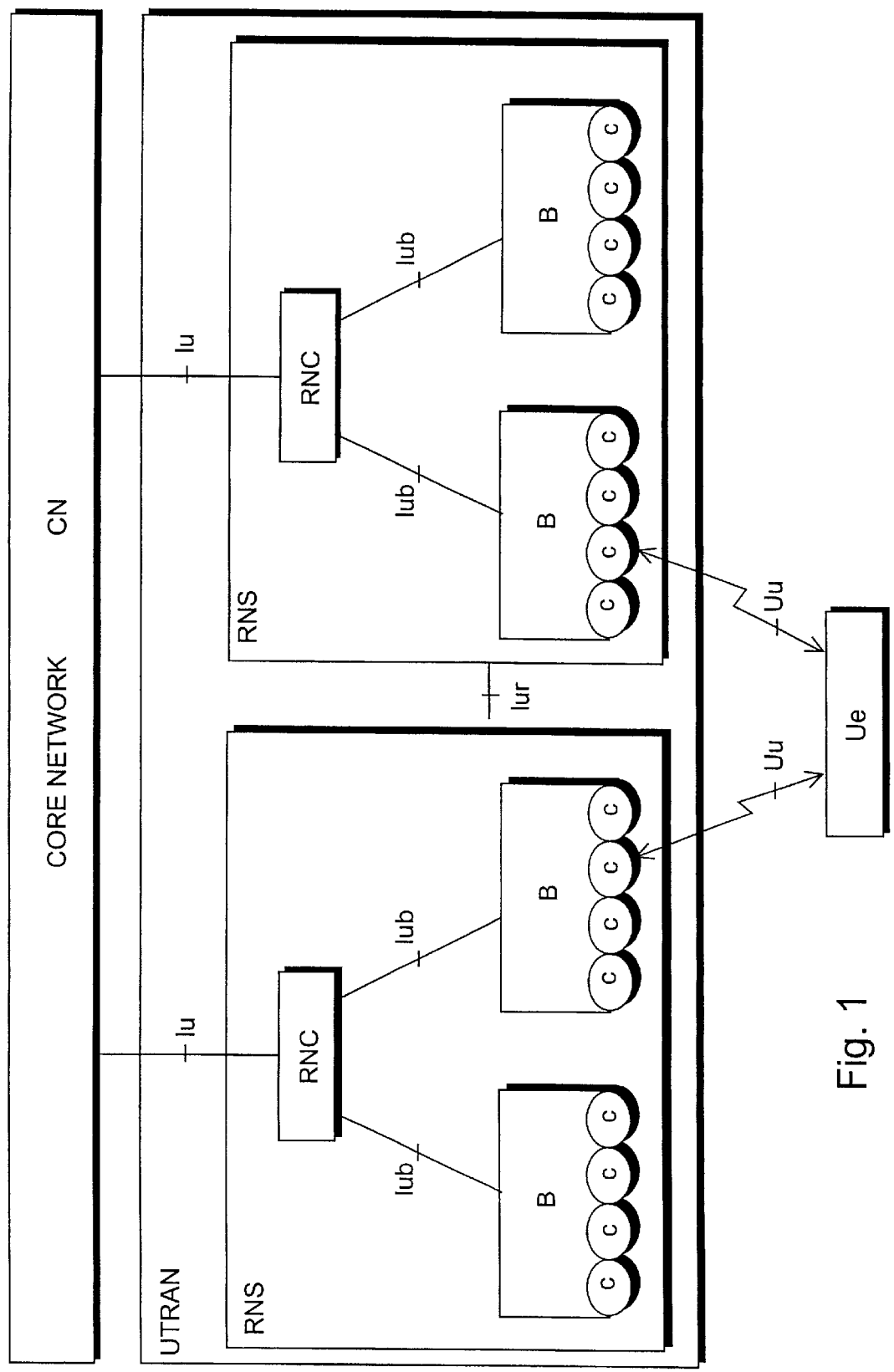
FIG. 1 shows an example of a telecommunication system.

Referring to FIG. 1, the structure of a mobile telephone system is described by way of example. The main parts of the mobile telephone system are a core network CN, a UMTS terrestrial radio access network UTRAN, and user equipment Ue. The interface between the CN and the UTRAN is called Iu, and the air interface between the UTRAN and the Ue is called Uu.

The UTRAN comprises radio network subsystems RNS. The interface between the radio network subsystems RNS is called Iur. An RNS comprises a radio network controller RNC and one or more nodes B. The interface between the RNC and node B is called Iub. The coverage area, i.e. cell, of node B is designated by C in the figure.

Figure 2:
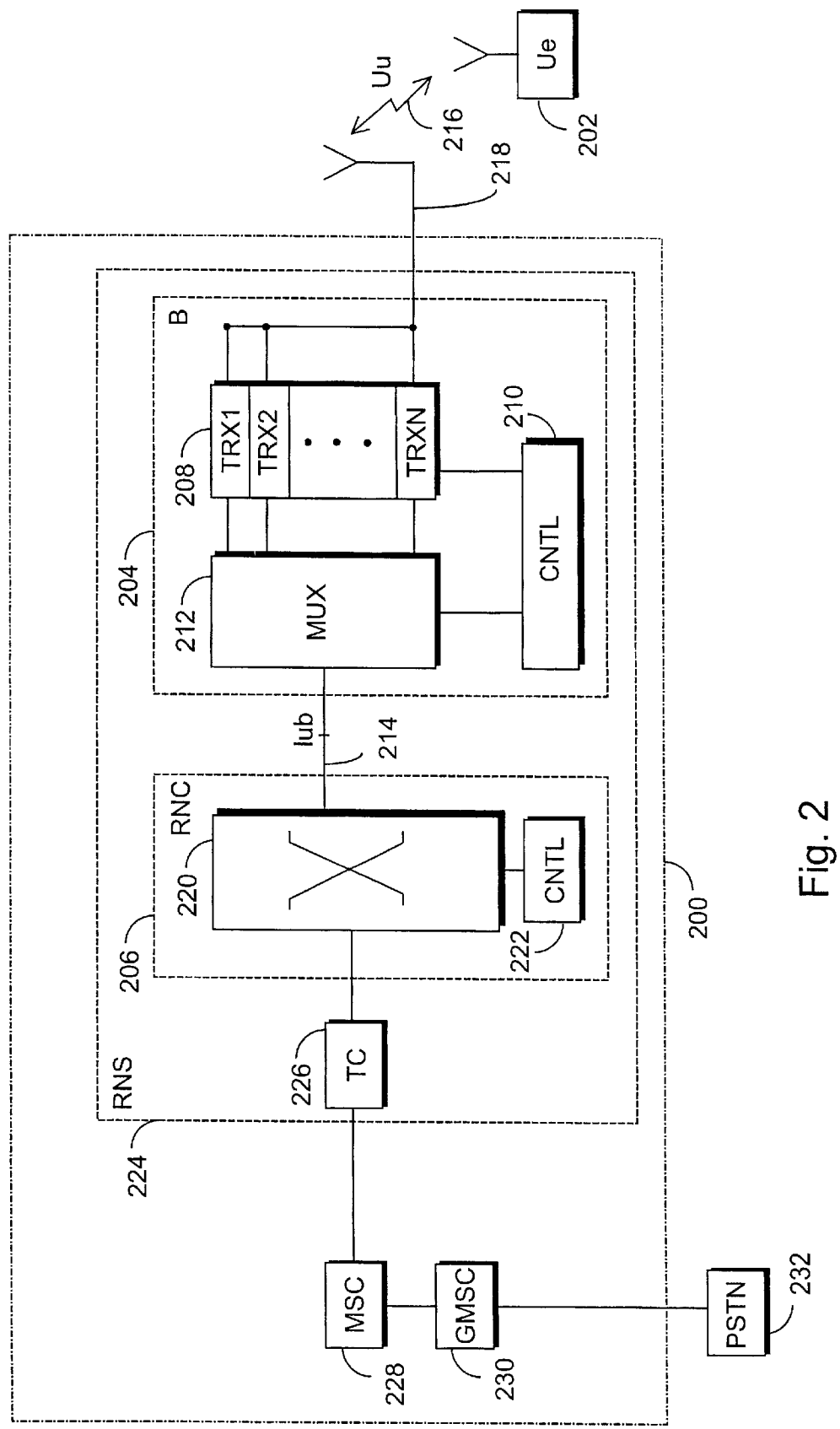
FIG. 2 shows another example of a telecommunication system.

The description shown in FIG. 1 is quite a general one, so FIG. 2 shows a more detailed example of a cellular radio system. FIG. 2 only comprises the most relevant blocks, but it is obvious to one skilled in the art that a conventional cellular radio network also comprises other functions and structures, which need not be explained in closer detail herein. The details of the cellular radio system may differ from those shown in FIG. 2, but these differences are irrelevant to the invention.

A cellular radio network thus typically comprises a fixed network infrastructure, i.e. a network part 200, user equipment 202, which can be fixedly located, positioned in a vehicle or portable equipment, such as mobile telephones or portable computers, enabling communication with a radio telecommunication system. The network part 200 comprises base transceiver stations 204. A base transceiver station corresponds to node B in the previous figure. A plurality of base transceiver stations 204, in turn, is controlled in a centralized manner by a radio network controller 206 connected thereto. The base transceiver station 204 comprises transceivers 208 and a multiplexer unit 212.

The base transceiver station 204 further comprises a control unit 210 to control the operation of the transceiver 208 and the multiplexer 212. The multiplexer is used for placing the traffic and control channels used by several transceivers 208 to one transmission link 214. The transmission link 214 forms the interface Iub.

The transceivers 208 of the base transceiver station 204 are connected to an antenna unit 218 to implement a radio connection 216 to the user equipment 202. The structure of frames to be transmitted on the radio connection 216 is determined system-specifically, and it is called an air interface Uu.

The radio network controller 206 comprises a switching field 220 and a control unit 222. The switching field 220 is used for switching speech and data and for connecting signalling circuits. A radio network subsystem 224 formed by the base transceiver station 204 and the radio network controller 206 further comprises a transcoder 226. The transcoder 226 is usually located as close to a mobile services switching centre 228 as possible since speech can then be transmitted in the cellular radio network form between the transcoder 226 and the radio network controller 206, thus using as little transmission capacity as possible.

The transcoder 226 converts the different digital speech encoding modes used between the public switched telephone network and the radio telephone network into compatible ones, e.g. from the mode of the fixed network into another mode of the cellular radio network, and vice versa. The control unit 222 performs call control, mobility management, collection of statistical data and signalling.

FIG. 2 further shows the mobile services switching centre 228 and a gateway mobile services switching centre 230, which is responsible for the connections of the mobile telephone system to the outside world, in this case to a public switched telephone network 232.

Figure 3:
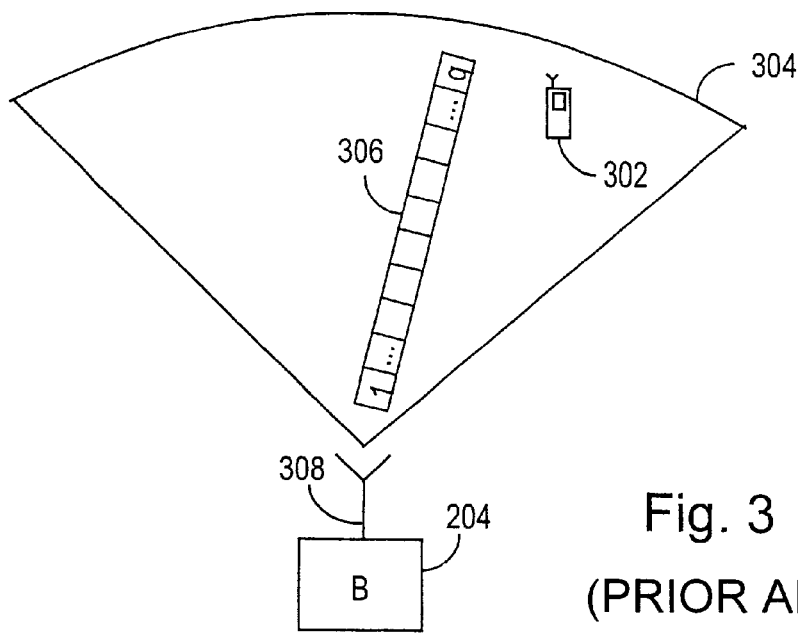
FIG. 3 shows an example of one-dimensional code acquisition.

FIG. 3 illustrates in a simplified manner a prior art one-dimensional, i.e. time dimensional, code acquisition. The base transceiver station 204 receives transmission from user equipment 302. The receiver of the base transceiver station 204 comprises only one antenna 308, so code acquisition is carried out in the entire area of a delay cell, i.e. an antenna sector 304. In the example of FIG. 3, the length of a spreading code 306 is q chips. In the code acquisition process, each possible code phase deviation between 1 . . . q chips of the spreading code of the received signal and the code generated by the receiver is then examined. When the codes are cophasal, an autocorrelation peak can be seen in the output of the correlator.

Figure 4:
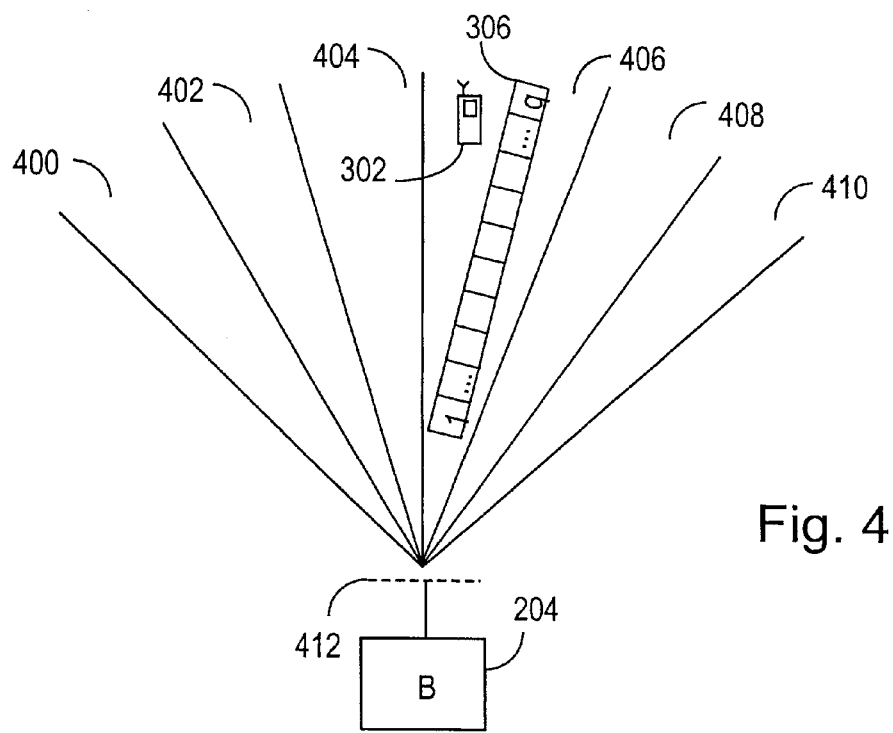
FIG. 4 shows an example of two-dimensional code acquisition.

FIG. 4 illustrates an example of two-dimensional code acquisition. The number and size of angular cells may differ from those shown in the figure. The situation shown in FIG. 4 has also been simplified for illustrative reasons, e.g. the system actually comprises more users and the geometry of the angular cells is not necessarily as shown herein. In the two-dimensional code acquisition process, the delay cell 304 shown in the example of FIG. 3 is divided into parallel angular cells 400, 402, 404, 406, 408 and 410, which, in an ideal case, do not overlap. Each angular cell can be regarded as an antenna beam generated by an antenna array 412 of the base transceiver station 204. The number m of angular cells is not fixed but can be changed at different times. The number m of angular cells is changed adaptively e.g. according to the signal-to-interference ratio (signal-to-interference ratio also takes noise into account) or according to the interference power.

In the two-dimensional code acquisition process, each possible code phase deviation, i.e. between 1 . . . q chips in the example of FIG. 4, of the spreading code of the received signal and the code generated by the receiver is examined in each angular cell. The number of delays to be tested during the duration of the spreading code, i.e. the length q of the spreading code 306, determines a time cell, which can be e.g. one chip long or only a part thereof (the duration of a time cell is chosen to enable a desired accuracy to be achieved). When there are m angular cells and the length of the code is q, code acquisition is carried out two-dimensionally in a total of Q=mq cells.

Figure 5:
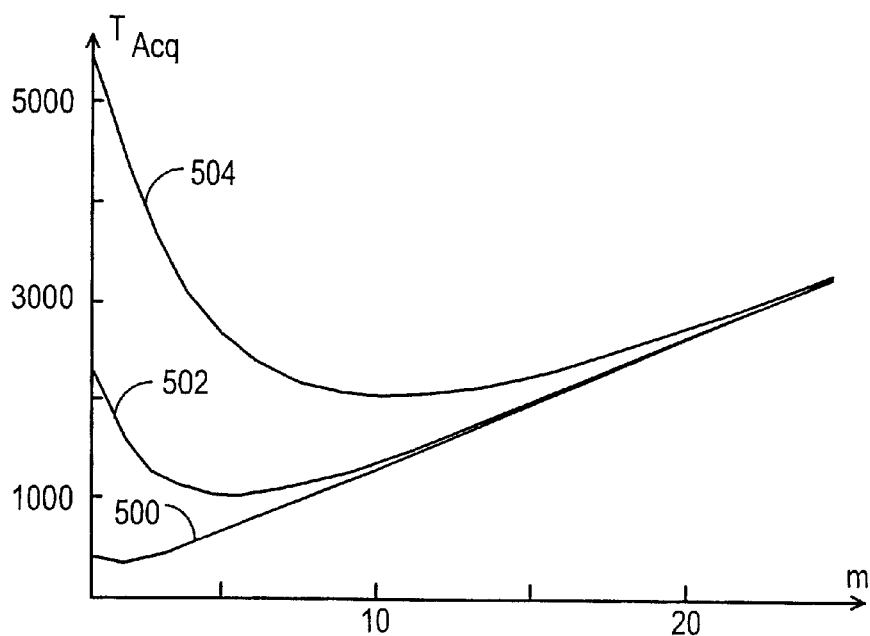
FIG. 5 shows an average duration of code acquisition as a function of the number of antenna elements when different signal-to-interference ratios are used.

Examine now, by means of the simulation results shown in FIG. 5, how the number of angular cells is chosen. In the example of FIG. 5, the number of angular cells is chosen utilizing the determination of a signal-to-interference ratio estimate. This method is mainly used when the synchronization threshold is to be an optimal one. When choosing the number of angular cells, it should be taken into account that a poor signal-to-interference ratio prolongs the code synchronization time. When the number of angular cells, i.e. the number of antenna beams, is increased by using array antennas, the signal-to-interference ratio can be improved because the antenna gain increases. It is to be noted, however, that as the number of angular cells increases, the code synchronization time increases accordingly because the number of time cell searches to be carried out increases.

FIG. 5 illustrates an average code acquisition duration $T_{ACQ}$ as multiples of a code sequence, as a function of the number m of angular cells at different signal-to-interference ratios. The lowest curve 500 shows a situation wherein the signal-to-interference ratio SNR=8 dB, the next to the lowest curve 502 shows a situation wherein SNR=3 dB and the topmost curve 504 shows a situation wherein SNR=0 dB. It can be seen from the figure that the code acquisition time is at its shortest at a certain number m of angular cells, which depends on the signal-to-interference ratio SNR. Since in the situation of the lowest curve 500 the signal to be received is clearly stronger than the interference, the code acquisition time is at its shortest when two angular cells are used. However, almost the same code acquisition time can also be achieved using one angular cell. When the signal-to-interference ratio drops to 3 dB in the case of the curve 502, the optimal number of angular cells is six as far as code acquisition is concerned.

FIG. 5 shows that in comparison to the use of one angular cell, the code acquisition time is clearly shortened when as few as two angular cells are used. When the signal-to-interference ratio is 0 dB, i.e. when the power of the signal to be received equals the interference power, which is designated by the curve 504, the code acquisition time is at its shortest when ten angular cells are used; however using e.g. seven or eight angular cells results in roughly the same acquisition time.

The process of choosing the number of necessary angular cells may also utilize other methods, such as determining the total interference level, which in many cases is the easiest way, using information obtained from previous code acquisition processes, such as the time spent on the acquisition process, or during the network planning stage, which enables the topography of the coverage area to be taken into account.

In addition to minimizing the code acquisition time, the number of antenna elements available also affects choosing the number of angular cells. The number of angular cells is thus not always chosen in order to minimize the code synchronization time but to optimize the code synchronization time and the number of antenna elements in an antenna array at each estimated signal-to-interference ratio.

The number of angular cells may also be the same as the number of antenna elements in an antenna array.

In the code acquisition process, it is possible that the system announces that code synchronization has been found even if the spreading code of the received signal and the code generated by the receiver have not actually been synchronized. This is called a false alarm, and it is caused by radio path interference due to different reasons. Next, determining the probability $P_{FA}$ of a false alarm will be described applying a constant false alarm rate CFAR principle. In the code acquisition process, a false alarm probability refers to the probability with which an incorrect spreading code delay could result. According to the CFAR principle, interference level is measured first. Instead of actually measuring the interference level, it can be estimated e.g. on the basis of the number of users, i.e. the higher the number of users in an angular cell, the higher the interference level. A signal-to-interference ratio estimate can be formed by setting a hypothetical power for a synchronization request signal, i.e. by assuming that the signal propagates at a certain strength. The user equipment usually transmits a signal in proportion to the power at which the equipment receives a signal. Hence, propagation loss is cancelled out and the power of the signal supplied from the user equipment can be estimated at the base transceiver station. The signal-to-interference ratio enables the necessary number of angular cells to be formed. However, calculating the number of angular cells necessitates information on threshold $T_H$, which is used for deciding about synchronization (choosing an optimal threshold may be problematic). This threshold value can be calculated utilizing the assumption that the false alarm probability $P_{FA}$ is a constant. The false alarm probability $P_{FA}$ can thus be freely chosen. The threshold $T_H$ is calculated according to the chosen false alarm probability $P_{FA}$.

Examine now the false alarm probability in closer detail. The probability function of the decision variable causing a false alarm follows the Rayleigh distribution and the false alarm probability $P_{FA}$ can be calculated by integrating the Rayleigh distribution from the threshold value to infinity as follows $$P_{FA} = \int_{T_H}^{\infty} \frac{y}{\sigma^2} \exp\left(\frac{-y^2}{2\sigma^2}\right) dy = \exp\left(\frac{-T_H^2}{2\sigma^2}\right),$$

wherein y is the received signal and $y=\sqrt{y_{I^2}+y_{Q^2}}$, $\sigma^2$ is the variance of variables $y_I$ and $y_Q$, i.e. the root mean square of the interference, $T_H$ is the threshold used for deciding about synchronization, $y_I$ and $y_Q$ are signal components according to IQ modulation (IQ modulation being obvious to one skilled in the art). This gives a threshold $T_{HCFAR}$ in the following manner $T_{HCFAR}=\sqrt{-2\sigma^2 \ln(P_{FA})}$.

The probability of finding the correct code delay is, in turn, $$P_D = \int_{T_H}^{\infty} \frac{y}{\sigma^2} \exp\left(\frac{-(y^2+s^2)}{2\sigma^2}\right) I_0\left(\frac{ys}{\sigma^2}\right) dy,$$

wherein $S^2=m_I^2+m_Q^2$ is an eccentricity parameter, wherein $m_I$ is the average value of the signal component $y_I$, and $m_Q$ is the mean value of the signal component $y_Q$, $I_0$ is a modified Bessel function of the first kind of zeroth order. By setting the false alarm probability threshold value $T_{HCFAR}$ at a desired point, the probability of a correct decision can also be estimated when the strength of the signal to be received or the signal-to-interference ratio is known, can be estimated or is set.

The average code acquisition time can be expressed in the following manner:

$$\overline{T}_{acq} = \frac{2 + (2-P_D)(Q-1)(1+KP_{FA})}{2P_D} \tau_d,$$

wherein $\tau_d$ is the time spent on calculating the decision making variable (the integrating time of FIG. 8), K relates to false alarm ineffective time ($K\tau_d$) and Q=mq. Ineffective time refers to the time spent on recovering from a false alarm. When the number m of angular cells is increased, the signal-to-interference ratio increases, the probability $P_D$ of correct code acquisition increases and the probability $P_{FA}$ of a false alarm decreases. The formula shows that this results in a shorter code acquisition time $\overline{T}_{acq}$. The signal-to-interference ratio increases when the number of angular cells is increased but at the same time the number Q of cells also increases. The higher the number Q of cells, the longer the code acquisition time $\overline{T}_{acq}$. This is disclosed in closer detail in *Spread Spectrum Communication Handbook* by M. Simon, J. Omura, R. Scholtz and B. Levitt, McGraw Hill, Inc., 1994, pages 768 to 770, which is incorporated herein by reference.

Figure 6:
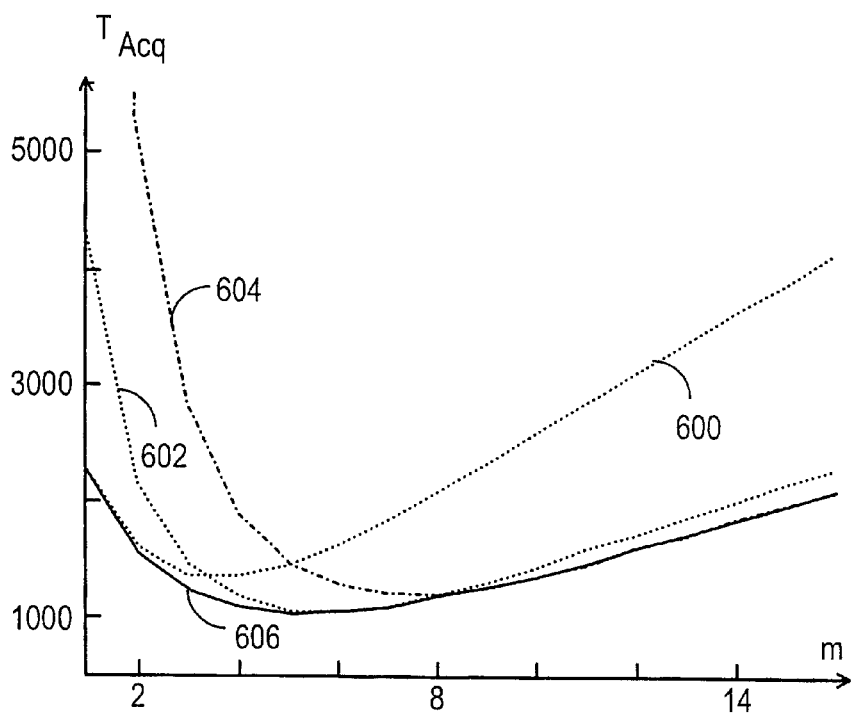
FIG. 6 shows an average duration of code acquisition at different false alarm probability values.

FIG. 6 shows code acquisition time as a function of angular cells when different $P_{FA}$ values are used. The signal-to-interference ratio is assumed to be SNR=3 dB. The different curves have been produced by changing the false alarm probability $P_{FA}$, which changes the synchronization decision threshold $T_H$. When the synchronization decision threshold changes, the code acquisition time also changes according to the curves. The first curve 600 shows a situation wherein the false alarm probability has been set to a value $P_{FA}=0.01$. According to the curve, the optimal number m of angular cells is three or four. The second curve 602 shows a situation wherein the false alarm probability has been set to a value $P_{FA}=0.001$. In this case, the optimal number m of angular cells is five or six. In the case of the third curve 604, the false alarm probability has been set to a value $P_{FA}=0.0001$. The optimal number m of angular cells is then eight. For instance, the false alarm probability could be chosen to be $P_{FA}=0.001$, the corresponding curve 602 quite closely following the optimal curve 606 determined using the actual signal-to-interference ratio.

It is to be noted that when the synchronization threshold is chosen using the CFAR method, the result is almost as good as when the optimal threshold is used. The CFAR method does not necessitate determining the signal-to-interference ratio, which is difficult to determine prior to synchronization, but a mere interference level estimate will suffice. The interference level can be determined in many ways, e.g. such that a base transceiver station receiving a signal knows the number of transmitters, i.e. user equipment, located in the coverage area and the transmission powers thereof, either accurately or with a certain probability. The base transceiver station can thus calculate the total interference power in the antennas.

Figure 7:
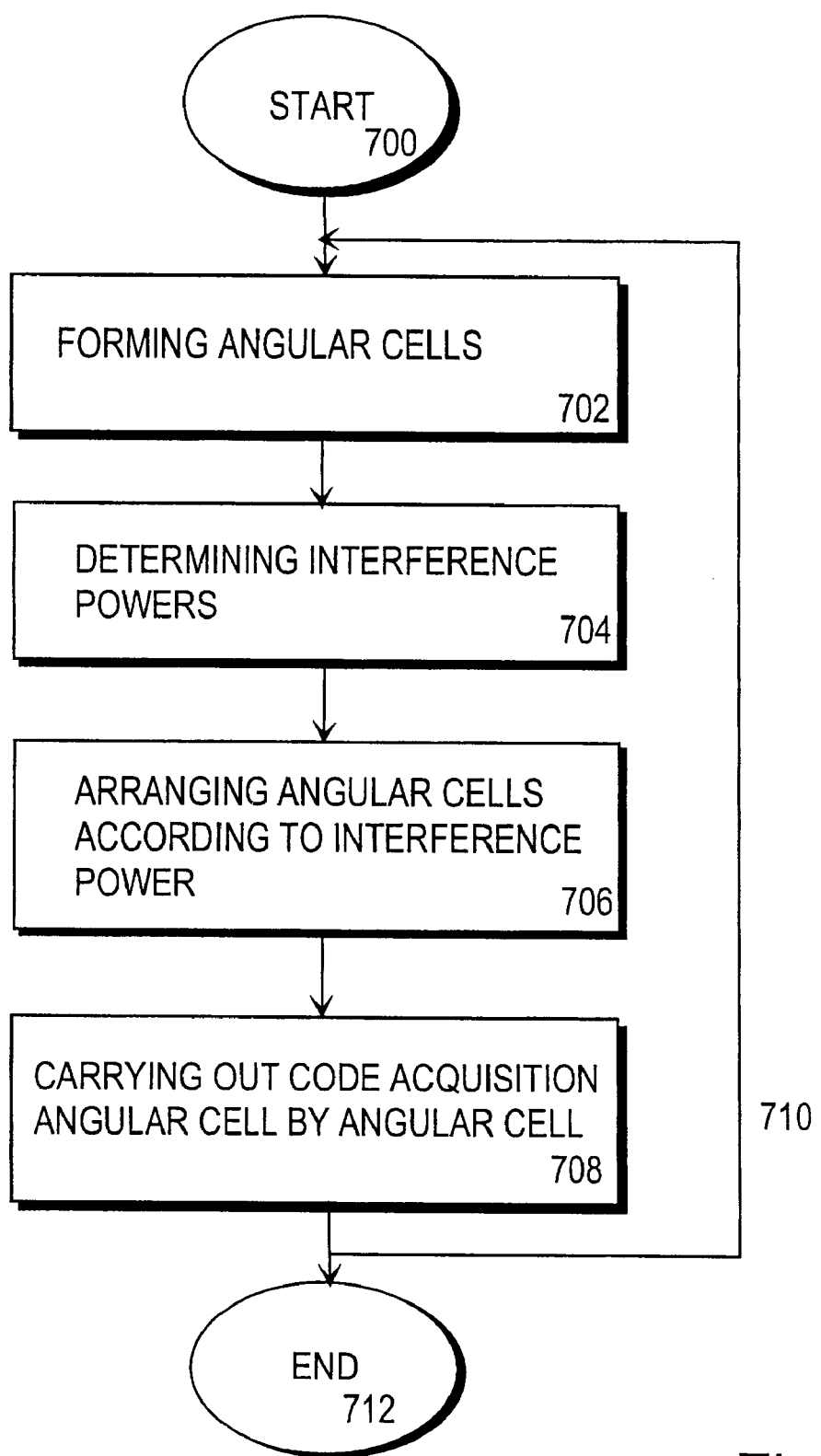
FIG. 7 is a flow diagram showing method steps of an embodiment of code acquisition.

Next, method steps of code acquisition according to a first embodiment will be described by means of FIG. 7. The process starts from block 700.

In block 702, a necessary number of angular cells is formed. The number of angular cells is chosen either in order to minimize the code acquisition time or in order to enable a desired acquisition time to be shortened by means of the antenna elements used. The process of choosing the number of angular cells has been described above.

In block 704, interference power is determined in each angular cell. The process of determining the interference power preferably, if an optimal synchronization threshold level is used, utilizes the interference power determined for the signal-to-interference estimate. The interference power in each angular cell can be determined e.g. by determining angular power distribution, i.e. angular power spectrum, by estimating the total power received from all directions, i.e. all angles of arrival, and by integrating the power angular-cell-specifically. Interference power may also simply be estimated such that the highest interference power is in the angular cell with the highest number of users. If the system allows signals with different bit rates to be transmitted, weighting coefficients can be determined for signals with high bit rates. The weighting coefficients enable the fact that signals with high bit rates cause more interference to other users than signals with low bit rates to be taken into account. Power estimation can be made more accurate also by taking the distance between the transmitter and the receiver into account. This allows signal attenuation on the radio path to be taken into account more accurately.

In block 706, the formed angular cells are arranged on the basis of the interference power. This is preferably implemented by arranging the angular cells as a vector in ascending order on the basis of the interference power. Hence, the angular cell with the lowest interference power becomes the first element of the vector and the angular cell with the highest interference power the last one.

In block 708, code acquisition is carried out in the angular cell with the lowest interference power (preferably the first element of an arranged angular cell vector) by comparing phase deviations between the spreading code of the received signal and the code generated by the receiver. The lower the interference power, the lower the probability of a false code synchronization alarm, and thus the shorter the time spent on code acquisition. The code phase deviations are compared in each angular cell at all possible delay values until synchronization is found.

Arrow 710 designates the repeatability of the method as a function of time if necessary.

The process ends in block 712.

Figure 9:
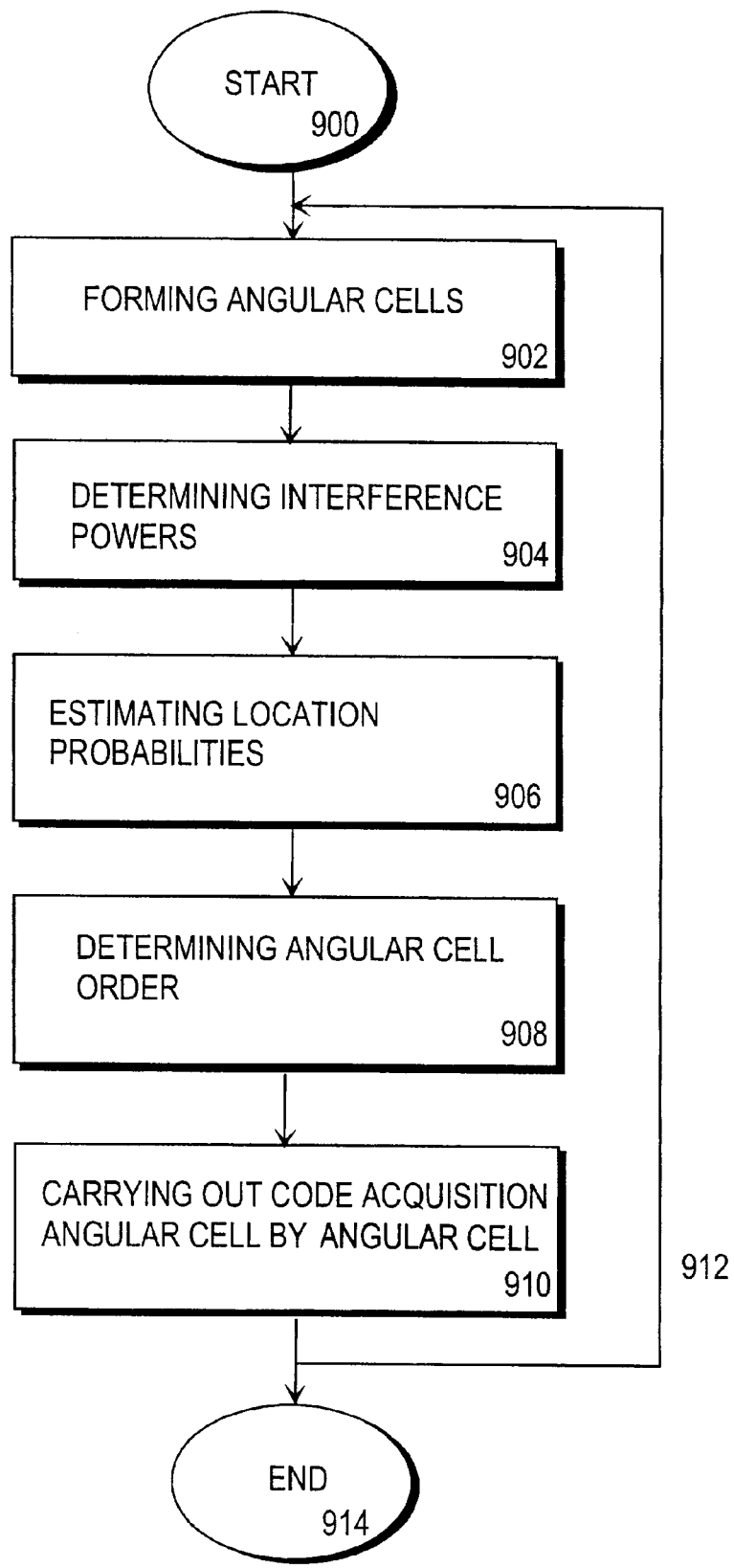
FIG. 9 is a flow diagram showing method steps of another embodiment of code acquisition.

Next, the flow diagram of FIG. 9 showing method steps of code acquisition according to a second embodiment will be described. The process starts in block 900.

In block 902, angular cells are formed in any one of the manners described above.

In block 904, interference power is determined in each angular cell in any one of the manners described above.

In block 906, user equipment location probabilities are determined in each angular cell. Usually a radio network, either a base transceiver station or e.g. a radio network controller, knows the user equipment locations accurately enough for determining the angular-cell-specific location probability of the user equipment. Location determination can also utilize e.g. satellite positioning. The ways in which user equipment locations are determined are irrelevant to the application of the method disclosed herein, so they are not described in closer detail herein.

In block 908, the order in which code acquisition is to be carried out is determined for the angular cells by utilizing an interference power estimate and location probability information on the user equipment, e.g. in the following manner: code acquisition starts in an angular cell wherein the interference level and location probability are optimal, e.g. acquisition starts in an angular cell with a low, but not necessarily the lowest, interference level if the user equipment is most probably located in this angular cell. This enables e.g. information on the topography of the coverage area to be utilized: it is e.g. known that there are mountains in the area or the area is otherwise difficult to travel, so it can be assumed that the user equipment most probably would not be located there. Code acquisition is thus started from an angular cell in which the user equipment is most probably located although the particular angular cell might have a higher interference level. In the angular cell arrangement process, either the interference level or the user equipment location probability can be weighted.

Furthermore, on the basis of the probability distribution only some of the angular cells can be chosen as those ones wherein code acquisition will be carried out, e.g. if it is most improbable that the user equipment is located in a particular angular cell, this angular cell can, at least first, be ignored in the code acquisition process. If, on the other hand, it is highly probable that the user equipment is located in a particular angular cell, code acquisition is carried out several times in this angular cell if necessary before changing the angular cell searched.

In block 910, code acquisition is carried out by examining the angular cells in chosen order until synchronization is found.

Arrow 912 designates the repeatability of the method as a function of time if necessary.

The process ends in block 914.

It is further to be noted that in order to carry out code acquisition, the angular cells can be arranged only on the basis of the user equipment location probability, i.e. code acquisition is first carried out in an angular cell in which the user equipment is located most probably and last in an angular cell in which the user equipment is located most unlikely.

Dividing the code synchronization area into angular cells also enables the operator to choose the first code acquisition angular cells on the basis of user profiles, e.g. customers that have paid for fast services are prioritized in the code acquisition process.

Figure 8:
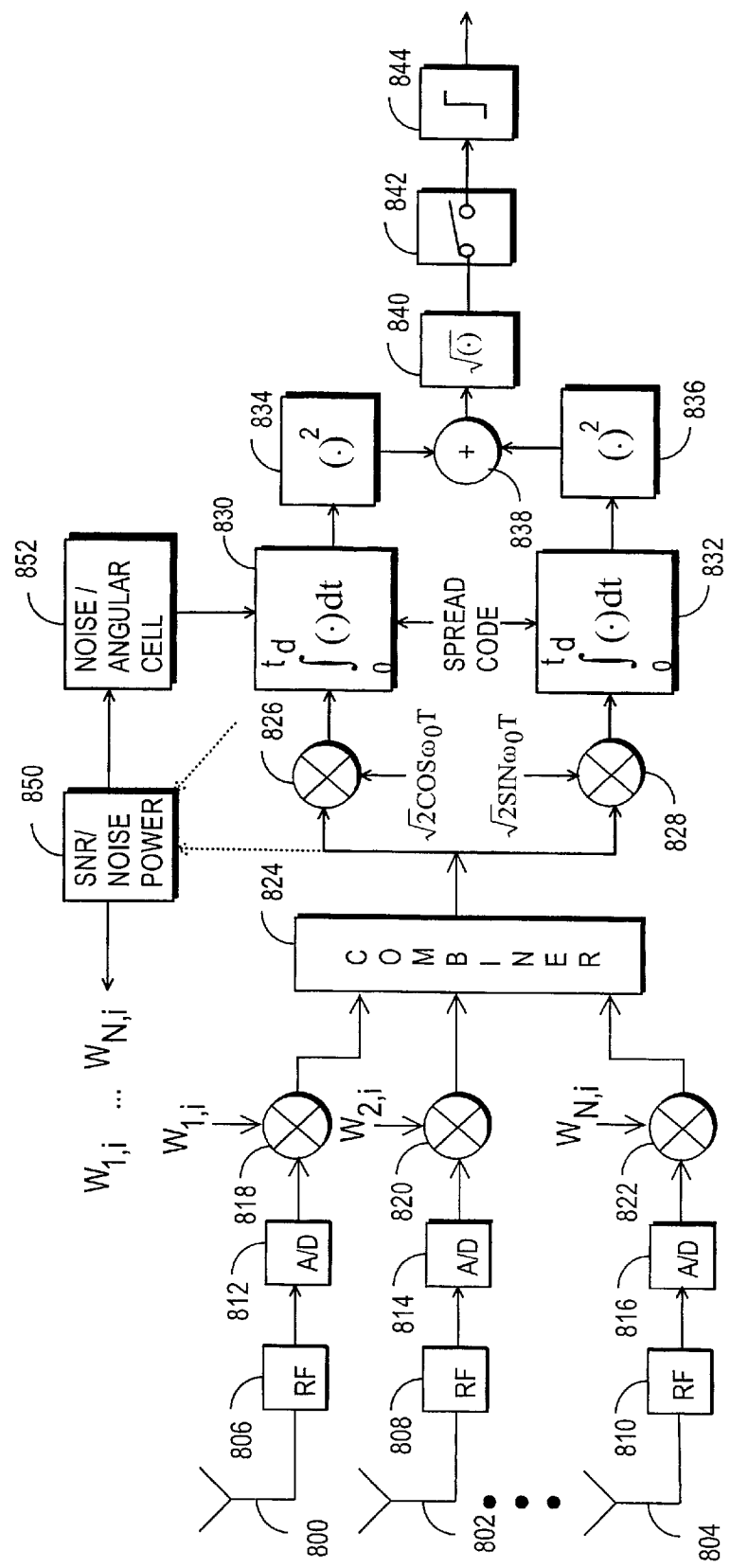
FIG. 8 is a block diagram showing a receiver.

FIG. 8 is a block diagram showing a possible implementation of a receiver. A signal is received by an antenna array comprising several antenna elements 800 to 804. From the antenna elements 800 to 804, the signals are supplied to radio frequency means 806 to 810, at which the received signal is down-converted from radio frequency to baseband. The baseband, analogue signal is converted into a digital one in A/D converters 812 to 816. The digital signals are multiplied by weighting coefficients $W_{1,i}$ to $W_{N,i}$ shaping the antenna patterns at multipliers 818 to 822. Weighting coefficient values $W_{1,i}$ to $W_{N,i}$ are formed at a signal-to-interference ratio estimator or at an interference level estimator 850, at which the signal-to-interference ratio or the total interference power is estimated. The signal-to-interference ratio or the interference level can be estimated in many different ways, which is why block 850 may receive estimation-related information from different parts of the receiver/base transceiver station. The weighted signals are combined in a combiner 824. Multiplying and combining the signals results in a desired angular cell. Different angular cells require different coefficients. Consequently, the weighting coefficients form a set (matrix) comprising N coefficient vectors, each vector comprising N elements, wherein N is the maximum number of angular cells (which corresponds to the number of antenna elements). Each vector at a time is chosen to be used as weighting coefficients to form a particular antenna beam. The set can be described using matrix $$\begin{bmatrix} w_{1,1} & \cdots & w_{N,1} \\ \vdots & \ddots & \vdots \\ w_{1,N} & \cdots & w_{N,N} \end{bmatrix},$$

wherein N is the number of antenna elements and the highest possible number of angular cells. Typically, the weighting coefficients are complex ones. If the number m of necessary angular cells is lower than the highest possible number N of angular cells, (N−m) weighting coefficients can be set to zero and m weighting coefficients can be formed, thus producing m angular cells. Angular cells can also be shaped analogously by phasing the radio frequency signals supplied to different antenna elements as desired. This, however, like the use of digital weighting coefficients as well, for directing and shaping an angular cell, is obvious to one skilled in the art and will not therefore be explained in closer detail herein.

In order to estimate the signal-to-interference ratio or the total interference power, the received interference power has already been estimated. Preferably on the basis of this interference power estimate, the interference power in each angular cell, i.e. angular power spectrum, is determined in block 852. The angular cells are preferably arranged as a vector in ascending order according to the interference power.

After the weighted signals have been combined, code acquisition is carried out in the time dimension in a manner known per se, using an incoherent correlator or a matched filter. Code acquisition starts in the angular cell with the lowest interference power. The weighted and combined signal is divided in two parts. The first signal is multiplied at a multiplier 826 by a signal $\sqrt{2}\cos(\omega_0 t)$ of a local oscillator (not shown in the figure), and the second signal is multiplied at a multiplier 828 by a phase orthogonal signal $\sqrt{2}\sin(\omega_0 t)$. Next, both multiplied signals are correlated by a spreading code in correlators 830 and 832. Instead of the correlators 830 and 832, it is also possible to use a matched filter adjusted for the spreading code to be found in a manner known per se. The result obtained is squared at multipliers 834 and 836. Finally, the real-valued results are summed in an adder 838, and a square root is calculated from the sum in block 840. The result is switched by a switch 842 to a comparator 844, which compares the result to a threshold value, and a decision is made about the correctness of the code phase on the basis of the comparison.

The above-described functional blocks of the user equipment, such as determining 852 the angular-cell-specific interference power, can be implemented in many ways, e.g. using software run by a processor or a hardware configuration, such as a logic built using separate components or ASIC (Application Specific Integrated Circuit).

Although the invention has been described above with reference to the example according to the accompanying drawings, it is obvious that the invention is not restricted thereto but can be varied in many ways within the scope of the inventive idea disclosed in the attached claims.

What is claimed is:

1. A method for carrying out code synchronization when a signal has been spread-coded by a pseudo-random spreading code, comprising
    forming angular cells;
    determining interference power in each angular all;
    arranging the angular cells according to the interference power;
    carrying out code acquisition by examining the arranged angular cells by using different delays of the spreading code, starting from the angular cell with the lowest interference power.

2. A method for carrying out code synchronization when a signal has been spread-coded by a pseudo-random spreading code, comprising
    forming angular cells;
    determining interference power in each angular cell;
    determining user equipment location probabilities in each angular cell;
    determining a code acquisition order for the angular cells by utilizing an interference power estimate and location probability information on the user equipment;
    carrying out code acquisition by examining the angular cells in chosen order.

3. A method for carrying out code synchronization when a signal has been spread-coded by a pseudo-random spreading code, comprising
    forming angular cells;
    determining user equipment location probabilities in each angular cell;
    determining a code acquisition order for the angular cells by utilizing location probability information on the user equipment;
    carrying out code acquisition by examining the angular cells in chosen order.

4. A method as claimed in claim 1, 2 or 3, wherein the number of angular cells to be formed is determined by means of a signal-to-interference ratio estimate.

5. A method as claimed in claim 1, 2 or 3, wherein the number of angular cells to be formed is determined by means of an interference power estimate.

6. A method as claimed in claim 1, 2 or 3, wherein the number of angular cells to be formed is determined on the basis of information obtained from previous code synchronization processes.

7. A method as claimed in claim 1, 2 or 3, wherein a radio network controller determines the number of angular cells to be formed.

8. A method as claimed in claim 1, 2 or 3, wherein a base transceiver station determines the number of angular cells to be formed.

9. A method as claimed in claim 1, 2 or 3, wherein an operator determines the number of angular cells to be formed.

10. A method as claimed in claim 1, 2 or 3, wherein the number of angular cells is the same as the number of antenna elements in an antenna array.

11. A method as claimed in claim 1, 2 or 3, wherein the number of angular cells to be formed is determined by means of a signal-to-interference ratio estimate and the signal-to-interference ratio estimate is formed by determining the total power of the received signal and the interference power in each antenna element of the antenna array.

12. A method as claimed in claim 1 or 2, wherein the interference power in each angular cell is determined by estimating the received total interference power and by forming an angular power spectrum by means of this estimate.

13. A method as claimed in claim 1 or 2, wherein the interference power is estimated by means of the number of users served by a base transceiver station.

14. A method as claimed in claim 1, 2 or 3, wherein the interference power is estimated by means of the number of users served by a base transceiver station and the number of angular cells to be formed is determined by means of an interference power estimate.

15. A method as claimed in claim 1, 2 or 3, wherein the number of angular cells is chosen such that the code acquisition time is minimized at each estimated signal-to-interference ratio.

16. A method as claimed in claim 1, 2 or 3, wherein the number of angular cells is chosen such that the code acquisition time and the number of antenna elements in the antenna array are optimized at each estimated signal-to-interference ratio.

17. A method as claimed in claim 1, 2 or 3, wherein the angular cells point in different directions.

18. A method as claimed in claim 1, 2 or 3, wherein the angular cells are located side by side.

19. A method as claimed in claim 1, 2 or 3, wherein the interference strength is estimated, a false alarm probability is set and a threshold by means of which a decision about synchronization is made is formed.

20. A method as claimed in claim 2, wherein a code acquisition order for the angular cells is determined by weighting a low interference level.

21. A method as claimed in claim 2, wherein a code acquisition order for the angular cells is determined by weighting the user equipment location probability.

22. A method as claimed in claim 1, wherein the angular cells are arranged in ascending order according to the interference power.

23. A method as claimed in claim 3, wherein the angular cells are arranged in descending order according to the user equipment location probability.

24. A receiver arranged to carry out code acquisition from a signal to be received, the signal having been spread-coded by a pseudo-random spreading code, comprising:
means for forming angular cells;
means for determining interference power in each angular cell;
means for arranging the angular cells according to the interference power;
means for carrying out code acquisition by examining the arranged angular cells by using different delays of the spreading code, starting from the angular cell with the lowest interference power.

25. A receiver arranged to carry out code acquisition from a signal to be received, the signal having been spread-coded by a pseudo-random spreading code, comprising:
means for forming angular cells;
means for determining interference power in each angular cell;
the receiver is arranged to determine user equipment location probabilities in each angular cell or the receiver is arranged to utilize location probability information on the user equipment;
means for determining a code acquisition order for the angular cells by utilizing an interference power estimate and the location probability information on the user equipment;
means for carrying out code acquisition by examining the arranged angular cells in chosen order.

26. A receiver arranged to carry out code acquisition from a signal to be received, the signal having been spread-coded by a pseudo-random spreading code, comprising:
means for forming angular cells;
the receiver being arranged to determine user equipment location probabilities in each angular cell or the receiver being arranged to utilize location probability information on the user equipment;
means for determining a code acquisition order for the angular cells by utilizing the location probability information on the user equipment;
means for carrying out code acquisition by examining the arranged angular cells in chosen order.

27. A receiver as claimed in claim 24, 25 or 26, wherein the number of angular cells to be formed is determined by means of a signal-to-interference ratio.

28. A receiver as claimed in claim 24, 25 or 26, wherein the number of angular cells to be formed is determined by means of an interference power estimate.

29. A receiver as claimed in claim 24, 25 or 26, wherein the number of angular cells to be formed is determined on the basis of information obtained from previous code synchronization processes.

30. A receiver as claimed in claim 24, 25 or 26, wherein a radio network controller determines the number of angular cells to be formed.

31. A receiver as claimed in claim 24, 25 or 26, wherein a base transceiver station determines the number of angular cells to be formed.

32. A receiver as claimed in claim 24, 25 or 26, wherein an operator determines the number of angular cells to be formed.

33. A receiver as claimed in claim 24, 25 or 26, wherein the number of angular cells is the same as the number of antenna elements in an antenna array.

34. A receiver as claimed in claim 24, 25 or 26, wherein the number of angular cells to be formed is determined by means of a signal-to-interference ratio estimate and the signal-to-interference ratio estimate is formed by determining the total power of the received signal and the interference power in each antenna element of the antenna array.

35. A receiver as claimed in claim 24 or 25, wherein the interference power is determined in each angular cell by estimating the received total interference power in all reception directions and by forming an angular power spectrum by means of this estimate.

36. A receiver as claimed in claim 24 or 25, wherein the interference power is estimated by means of the number of users served by a base transceiver station.

37. A receiver as claimed in claim 24, 25 or 26, wherein the interference power is estimated by means of the number of users served by a base transceiver station and the number of angular cells to be formed is determined by means of an interference power estimate.

38. A receiver as claimed in claim 24, 25 or 26, wherein the number of angular cells is chosen such that the code acquisition time is minimized at each estimated signal-to-interference ratio.

39. A receiver as claimed in claim 24, 25 or 26, wherein the number of angular cells is chosen such that the code acquisition time and the number of antenna elements in the antenna array are optimized at each estimated signal-to-interference ratio.

40. A receiver as claimed in claim 24, 25 or 26, wherein the angular cells point in different directions.

41. A receiver as claimed in claim 24, 25 or 26, wherein the angular cells are located side by side.

42. A receiver as claimed in claim 24, 25 or 26, wherein the interference strength is estimated, a false alarm probability is set and a threshold is formed by means of which a decision about synchronization is made.

43. A receiver as claimed in claim 25, wherein a code acquisition order is determined for the angular cells by weighting a low interference level.

44. A receiver as claimed in claim 25, wherein a code acquisition order is determined for the angular cells by weighting the user equipment location probability.

45. A receiver as claimed in claim 24, wherein the angular cells are arranged in ascending order according to the interference power.

46. A receiver as claimed in claim 26, wherein the angular cells are arranged in descending order according to the user equipment location probability.

* * * * *